(12) United States Patent
Tsutsumi

(10) Patent No.: US 7,631,829 B2
(45) Date of Patent: Dec. 15, 2009

(54) FISHING REEL

(75) Inventor: Wataru Tsutsumi, Setagaya-ku (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 12/174,373

(22) Filed: Jul. 16, 2008

(65) Prior Publication Data

US 2009/0026300 A1 Jan. 29, 2009

(30) Foreign Application Priority Data

Jul. 26, 2007 (JP) ............................. 2007-195071

(51) Int. Cl.
*A01K 89/01* (2006.01)
(52) U.S. Cl. ..................................... 242/288; 242/289
(58) Field of Classification Search ................. 242/288, 242/289, 302, 303
See application file for complete search history.

(56) References Cited

U.S. PATENT DOCUMENTS 4,434,951 A * 3/1984 Nakajima ................... 242/288
5,996,921 A * 12/1999 Hogaki et al. ............... 242/289
6,086,005 A * 7/2000 Kobayashi et al. .......... 242/288
6,126,105 A * 10/2000 Yamaguchi ................. 242/288
6,336,605 B1 * 1/2002 Littau et al. ................. 242/289
6,422,498 B1 * 7/2002 Littau et al. ................. 242/288
7,165,737 B2 * 1/2007 Nakagawa et al. .......... 242/288

FOREIGN PATENT DOCUMENTS

JP         3610276 B2     10/2004

* cited by examiner

*Primary Examiner*—Emmanuel M Marcelo
(74) *Attorney, Agent, or Firm*—Sughrue Mion, PLLC

(57) ABSTRACT

A fishing reel according to the invention has a magnetic braking device which includes an electrically conductive body supported so as to move in an axial direction with respect to a spool shaft, on one side of a spool, a magnet which is provided on a reel body and arranged so as to be opposed to the electrically conductive body in a radial direction, and centrifugal collars which move in the radial direction along with rotation of the spool, and allow the electrically conductive body to enter into and retreat from a magnetic field of the magnet, by an engaging action with the spool thereby to increase and decrease a magnetic braking force to be exerted on the spool. The fishing reel is characterized by further including an axial movement holding mechanism for holding the magnet so as to move in the axial direction.

3 Claims, 6 Drawing Sheets ved with the two
FISHING REEL

BACKGROUND OF THE INVENTION

The present invention relates to a fishing real provided with a backlash preventing device for preventing excessive rotation of a spool which is rotatably held between side plates of a reel body, at a time of discharging a fishing line.

Conventionally, at the time of discharging the fishing line (at a time of casting, for example), a backlash phenomenon may occur, when a rotation speed of the spool becomes larger than a reel-out speed of the fishing line (excessive rotation), and troubles such as entanglement or bite of the fishing line may occur. Therefore, it has been conducted that a backlash preventing device for automatically preventing the excessive rotation of the spool is mounted on the reel for casting.

Generally, the backlash preventing device is so constructed that a braking force is applied to the rotation of the spool. For example, a magnetic braking device utilizing a magnetic force, as disclosed in Japanese Patent No. 3610276, has been known. In this magnetic braking device, an electrically conductive body which rotates integrally with the spool is positioned in a magnetic field formed by a magnet, whereby a braking force is applied to the rotation of the electrically conductive body by an electromagnetic force generated with the rotation of the electrically conductive body, and at the same time, a braking force is applied to the spool which rotates integrally with the electrically conductive body.

Specifically, in the magnetic braking device disclosed in Japanese Patent No. 3610276, the electrically conductive body is moved to enter into and retreat from the magnetic field resisting an urging force, according to the rotation speed of the spool at the time of casting. In this manner, unnecessary restraint on the rotation of the spool during an initial period and a terminal period of casting is eliminated, whereby a casting distance is enhanced, and at the same time, the electrically conductive body which moves in an axial direction according to the rotation speed of the spool can be selected between an operative position and an inoperative position.

By the way, in a fishing place, depending on conditions of a game fish and a fishing place, such as long casting (full swing casting) in case of casting a bait far away, preferring enhancement of the casting distance, and short casting in case of casting the bait to a nearby point, and so on, as the conditions for discharging the bait, discharging operation of the bait and spool braking performance of the reel which are the best to an angler are required.

However, in the above described conventional art, the electrically conductive body which moves in the axial direction according to the rotation speed of the spool can be selected between the operative position and the inoperative position. Therefore, the braking performance of the spool is limitative, and there is a problem that the casting operation utilizing the optimum braking performance matching with various conditions of the fishing place at the time of actual fishing is unable to be performed.

SUMMARY OF THE INVENTION

This invention has been made in view of the above described circumstances, and it is an object of the invention to provide a fishing reel provided with a magnetic braking device which can cope with both short casting and long casting according to various condition changes of a fishing place.

In order to solve the above described problems, there is provided, according to the invention, a fishing reel comprising a magnetic braking device which includes an electrically conductive body supported so as to move in an axial direction with respect to a spool shaft, on one side of a spool which is rotatably held by a reel body, a magnet which is provided on the reel body and arranged so as to be opposed to the electrically conductive body in a radial direction, and a radially moving member which moves in the radial direction along with rotation of the spool, and allows the electrically conductive body to enter into and retreat from a magnetic field of the magnet, by an engaging action with the spool thereby to increase and decrease a magnetic braking force to be exerted on the spool, characterized in that the fishing reel includes an axial movement holding mechanism for holding the magnet so as to move in the axial direction.

According to the above described structure, the magnet for giving the magnetic field to the electrically conductive body is held so as to move in the axial direction. Therefore, it is possible to adjust the position of the magnet according to the conditions of the fishing place. In other words, by varying the axial position of the magnet, it is possible to change or set the braking force to be exerted on the spool through the electrically conductive body into the optimum state.

According to the invention, a fishing reel provided with a magnetic braking device which can cope with both short casting and long casting according to various condition changes of a fishing place can be obtained.

DETAILED DESCRIPTION OF PREFERRED EMBODIMENTS

Figure 1:
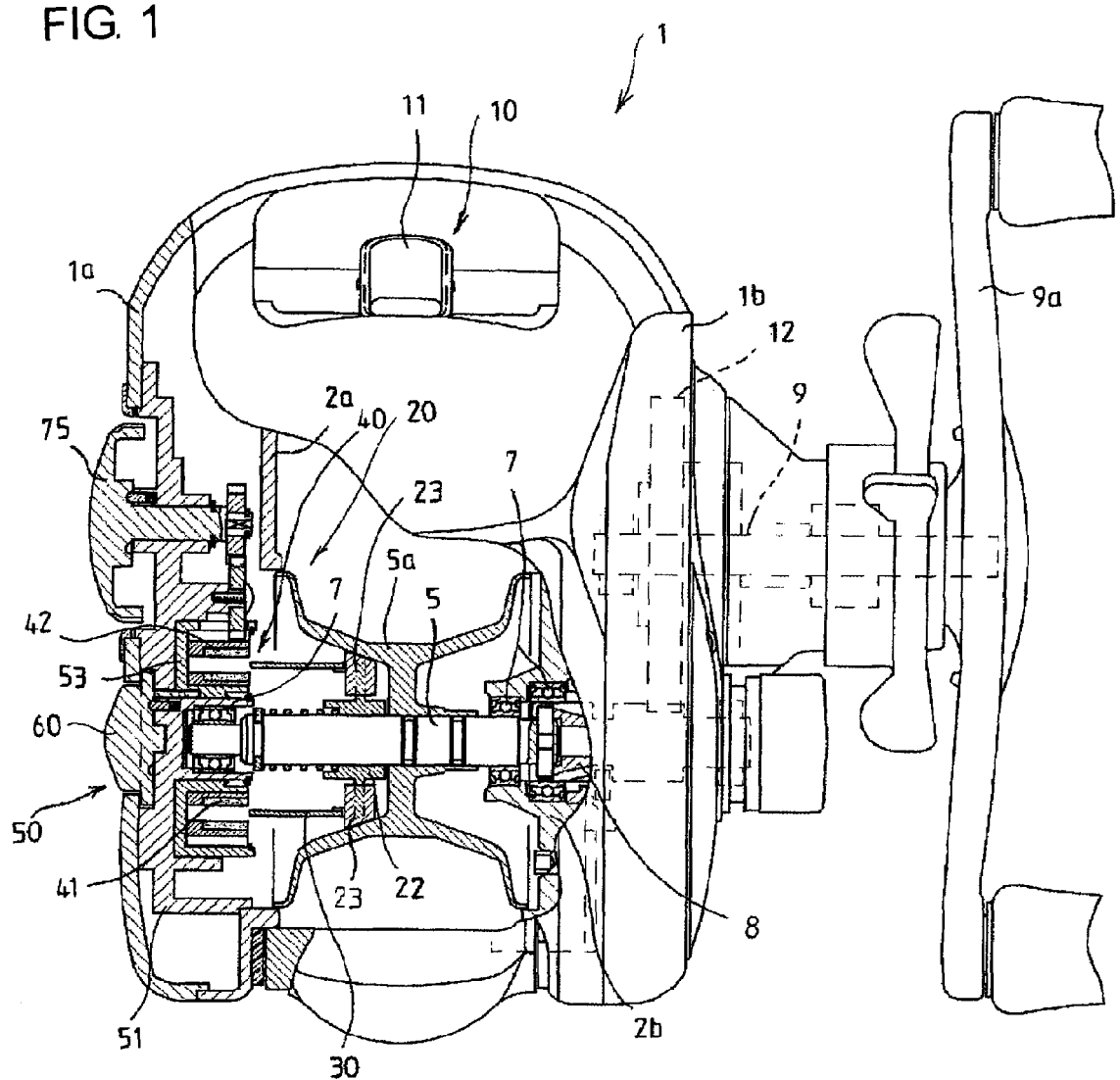
FIG. 1 is a plan view showing an internal structure of a fishing reel in a first embodiment according to the invention.

Now, an embodiment of the fishing reel according to the invention will be described referring to the drawings.

Figure 2:
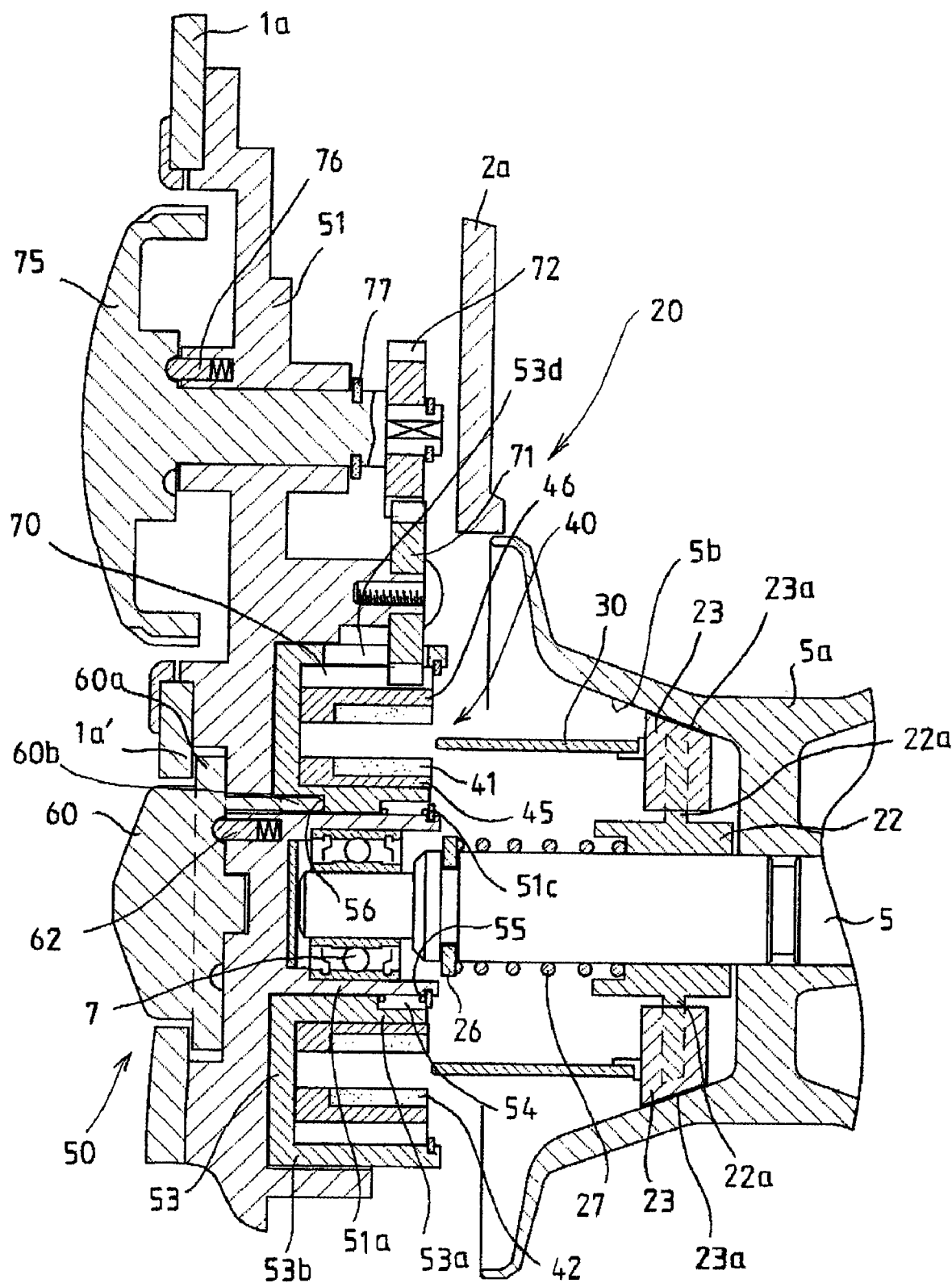
FIG. 2 is an enlarged view showing a structure of a part including a magnetic braking device.
Figure 3:
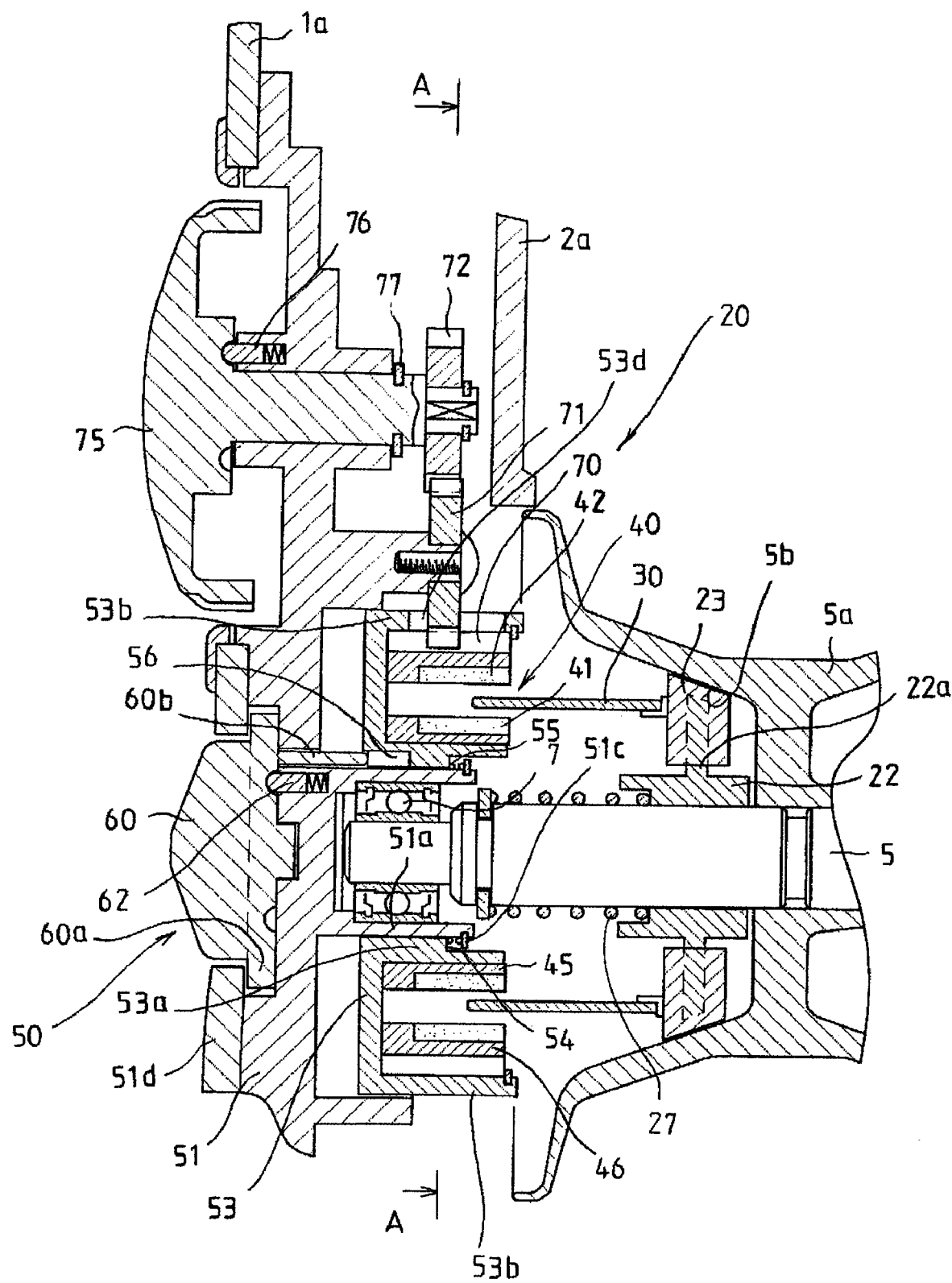
FIG. 3 is an enlarged view showing a state where a magnet has been moved from the state as shown in FIG. 2.
Figure 4:
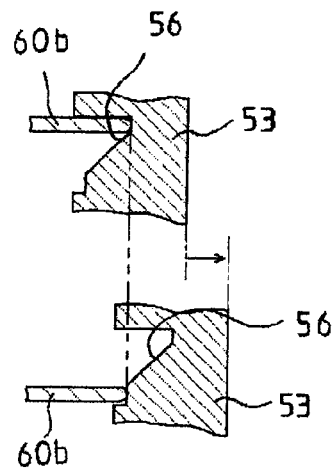
FIG. 4 is a view schematically showing cam action in the structure as shown in FIGS. 2 and 3.
Figure 5:
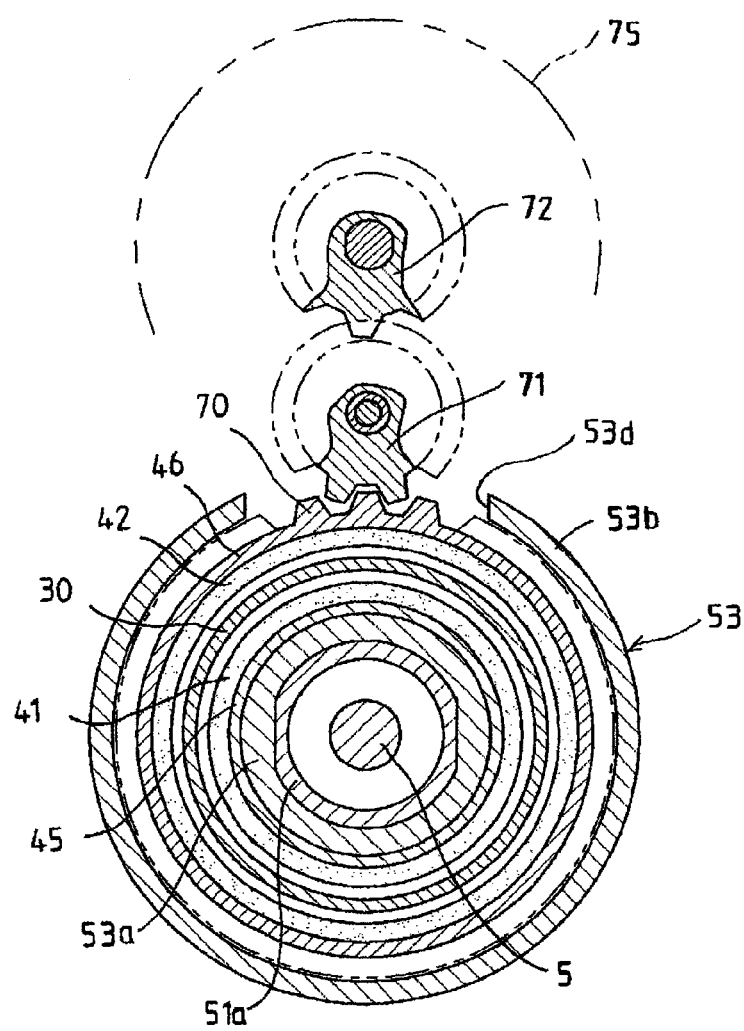
FIG. 5 is a sectional view taken along a line A-A in FIG. 3.

FIGS. 1 to 5 show a first embodiment of the invention. FIG. 1 is a plan view showing an internal structure of a fishing reel, FIG. 2 is an enlarged view showing a structure of a part including a magnetic braking device, FIG. 3 is an enlarged view showing a state where a magnet has been moved from a state as shown in FIG. 2, FIG. 4 is a view schematically showing cam action in the structure as shown in FIGS. 2 and 3, and FIG. 5 is a sectional view taken along a line A-A in FIG. 3 (bearings are omitted).

As shown in FIG. 1, a double bearing type reel 1, as the fishing reel according to the embodiment, includes a reel body having right and left side plates 1*a*, 1*b*, and right and left frames 2*a*, 2*b* which are respectively covered with the two side plates 1*a*, 1*b*. A spool shaft 5 is rotatably supported between the right and left frames 2*a*, 2*b* by means of bearings 7, and a spool 5*a* around which a fishing line is wound is integrally fixed to the spool shaft 5.

A pinion gear 8 which is movable in an axial direction of the spool shaft 5 is attached to an end portion of the spool shaft 5 which is projected from the right frame 2*b*. This pinion gear 8 is moved by known switching means (not shown) between an engaged position (power transmitted state) where the pinion gear 8 is engaged with the spool shaft 5 to be integrally rotated with the spool shaft 5, and a disengaged position (power interrupted state) where the engagement with the spool shaft 5 has been released. In addition, a drive gear 12 is meshed with the pinion gear 8, and a handle 9*a* is attached to an end of a handle shaft 9 which is attached to the drive gear 12. Accordingly, by rotating the handle 9*a*, the spool shaft 5 is driven to rotate by way of the drive gear 12 and the pinion gear 8, and along with the rotation of the spool shaft 5, the spool 5*a* is rotated.

Moreover, a known level winding unit 10 is provided between the right and left frames 2*a*, 2*b* in a direction of reeling out a fishing-line of the spool 5*a*. This level winding unit 10 is so constructed that by rotating the handle 9*a*, a fishing line guide 11 through which the fishing line passes can move to the right and left, whereby the fishing line is uniformly wound around the spool 5*a* along with winding operation of the fishing line.

Further, in this embodiment, a magnetic braking device 20 for preventing excessive rotation of the spool 5*a* at the time of discharging the fishing line is provided at a side of the left side plate.

The magnetic braking device 20 includes a moving body 22 in a tubular shape which is arranged on an outer peripheral face of the spool shaft 5, and engaged with the spool shaft 5 so as to move in the axial direction and so as not to rotate. A plurality of support members 22*a* in a cut-out shape which are extended in a radial direction are formed on an outer peripheral face of the moving body 22 at a determined interval, and centrifugal collars (radially moving members) 23 are respectively supported by the support members 22*a* so as to move in the radial direction. These centrifugal collars 23 are adapted to move outwardly in the radial direction with respect to the support members 22*a* by a centrifugal force, when the spool shaft 5 (and the moving body 22) is rotated together with the spool 5*a*.

An electrically conductive body 30 in an annular shape is held at one side of the aforesaid centrifugal collars 23 (at the side of the left side frame 2*a*). This electrically conductive body 30 is adapted to move in the axial direction with respect to the spool shaft 5, along with the movement of the moving body 22.

The spool 5*a* is provided with a taper face 5*b*, as an axial conversion control part, which is gradually enlarged in diameter in a direction toward the left frame 2*a*, on a back face of the face around which the fishing line is wound. This taper face 5*b* is brought into face contact (engaged) with slanted faces 23*a* which are formed on outer faces of the centrifugal collars 23, when the centrifugal collars 23 move outwardly in the radial direction, thereby to guide the movements of the centrifugal collars 23. Specifically, the centrifugal collars 23 supported by the support members 22*a* of the moving body 22 move in the radial direction by the centrifugal force generated with the rotation of the spool shaft 5 (the spool 5*a*), by engaging action between the taper face 5*b* and the slanted faces 23*a*, and guided along the taper face 5*b*. In this manner, the moving body 22 which supports the electrically conductive body 30 in the annular shape can be moved in the axial direction toward the left frame 2*a* (the movements of the centrifugal collars 23 in the radial direction are converted to the movement of the moving body 22 in the axial direction).

Moreover, a retainer 26 is fixed to one end of the spool shaft 5, and a spring member 27 which always urges the moving body 22 in a direction toward the spool 5*a* (always urges the electrically conductive body 30 toward the spool 5*a* in a direction away from a magnetic field of a magnet, which will be described below) is interposed between the retainer 26 and the moving body 22.

The aforesaid magnetic braking device 20 further includes a magnet 40 which is provided at a side of the left side plate 1*a* of the reel body and exerts a magnetic force on the aforesaid electrically conductive body 30 which is movable in the axial direction. This magnet 40 may be such that it applies the magnetic force to the electrically conductive body 30 which moves back and forth in the axial direction along with the rotation of the spool 5*a*, thereby to apply a braking force to the electrically conductive body 30. In this embodiment, the magnet 40 includes an inner magnet 41 which is formed in an annular shape and arranged so as to be opposed to an inner face of the electrically conductive body 30 at a determined distance, and an outer magnet 42 which is formed in an annular shape and arranged so as to be opposed to an outer face of the electrically conductive body 30 at a determined distance. Specifically, the aforesaid electrically conductive body 30 can enter into and retreat from the magnetic field generated in a gap between the inner magnet 41 and the outer magnet 42, and exerts a magnetic braking force on the spool 5*a*. The magnets 41, 42 are attached to holders 45, 46, respectively interposing heelpieces for magnetic shielding, which are not shown.

The aforesaid magnet 40 formed in the annular shape is held by an axial movement holding mechanism 50 so as to move in the axial direction. An exemplified structure of this axial movement holding mechanism 50 will be described below.

The axial movement holding mechanism 50 includes a support plate 51 mounted to the left side plate 1*a* and formed with a support part 51*a* which is projected so as to enclose a left end portion of the spool shaft 5, and a magnet holding body 53 which is engaged with an outer periphery of the support part 51*a* so as to move in the axial direction and so as not to rotate. In this case, the magnet holding body 53 includes an inner annular wall 53*a* and an outer annular wall 53*b*. The inner annular wall 53*a* is engaged with the aforesaid support part 51*a* so as to move in the axial direction and so as not to rotate. The inner magnet 41 is attached to the outer periphery of the inner annular wall 53*a* interposing the holder 45, and the outer magnet 42 is rotatably arranged on the inner periphery of the outer annular wall 53*b* interposing the holder 46.

The aforesaid inner annular wall 53*a* is provided with an annular recess (cut-out) 54 which opens toward the spool. An urging spring 55 is interposed between the annular recess 54 and a retainer 51*c* which is attached to a tip end of the support part 51*a* thereby to urge the magnet holding body 53 in a direction away from the spool. The inner annular wall 53*a* is further formed with a helical cam face 56 in an annular shape which opens in the direction away from the spool and has differences in height along a circumferential direction.

A knob (a first knob) 60 is rotatably mounted on the aforesaid support plate 51 so as to be exposed outward in a manner of entering into an opening edge 1*a*' of the left side plate 1*a* which is attached to the support plate. This first knob 60 is provided with an urging member 62 (composed of an engaging pin and a spring) which is interposed between the knob 60 and the support plate 51, whereby the first knob 60 is prevented from rotating, and a flange 60*a* is opposed to the opening edge 1*a*', whereby removal of the first knob 60 is prevented. Moreover, the first knob 60 is integrally provided with an engaging projection 60*b* which is engaged with the aforesaid helical cam face 56 having the differences in height.

The engagement between the cam face 56 and the engaging projection 60b is always maintained by an urging force of the aforesaid urging spring 55.

According to the above described structure, by rotating the first knob 60, it is possible to move the magnet bolding body 53 toward the spool in the axial direction (in a direction of an arrow mark) against an urging force of the urging spring 55, by cam action between the cam face 56 and the engaging projection 60b, as schematically shown in FIG. 4. On the other hand, by rotating the first knob 60 in the reverse direction, it is possible to move the magnet bolding body 53 away from the spool in the axial direction by cam action between the cam face 56 and the engaging projection 60b and by the urging force of the urging spring 55. In this case, by moving the magnet holding body 53 along the axial direction, an overlapped area of the inner magnet 41 and the outer magnet 42 with respect to the electrically conductive body 30, that is, the initial set position can be changed. In this manner, it is possible to adjust an initial magnetic braking force and a terminal magnetic braking force to be exerted on the electrically conductive body 30 which is positioned between the inner and outer magnets 41, 42. FIG. 3 shows a state where the magnet holding body 53 has been moved toward the spool along the axial direction.

Moreover, in this embodiment, the outer magnets 42 (the holder 46) of the magnet 40 which is held by the magnet holding body 53 as described above is constructed so as to rotate. Specifically, a gear 70 is mounted on the outer peripheral face of the holder 46 which holds the outer magnet 42 (the gear 70 may be integrally formed on the outer peripheral face of the holder 46), and an opening 53d is formed in the outer annular wall 53b of the aforesaid magnet holding body 53, so that an intermediate gear 71 which is rotatably held by the support plate 51 is meshed with the gear 70 through this opening 53d.

On the other hand, a knob (a second knob) 75 is rotatably mounted on the aforesaid support plate 51 so as to be exposed to the exterior. This second knob 75 is arranged so as to pass through the support plate 51 and retained by a retainer 77, and at the same time, prevented from rotating by an urging member 76 (composed of an engaging pin and a spring). Moreover, an input gear 72 which is meshed with the intermediate gear 71 is mounted on an inner end portion of the second knob 75 in the axial direction.

According to the above described structure, by rotating the second knob 75, the gear 70 and accordingly, the outer magnet 42 can be rotated through a coupling structure of the gears as described above, as schematically shown in FIG. 5. In this case, when the outer magnet 42 is rotated, polarity relation between the inner magnet 41 and the outer magnet 42 is varied, whereby it becomes possible to adjust the magnetic braking force to be exerted on the electrically conductive body 30 which is positioned between them.

Then, operation of the double bearing type reel 1 having the above described structure will be described.

When the spool 5a is rotated by casting, for example, the moving body 22 too is rotated integrally with the spool 5a. In the initial period immediately after the casting has started, the centrifugal force exerted on the centrifugal collars 23 is weak, until the rotation speed of the spool 5a reaches the determined value, and so, a component force of pressure of the centrifugal collars 23 with respect to the taper face 5b of the spool 5a is smaller than the urging force of the spring member 27. Therefore, the moving body 22 will hardly move in the axial direction with respect to the spool shaft 5, as shown in FIG. 2, and the electrically conductive body 30 which is attached to the moving body 22 will not enter into the annular space which is formed between the inner magnet 41 and the outer magnet 42.

Thereafter, when the rotation speed of the spool 5a is increased and the centrifugal force exerted on the centrifugal collars 23 has exceeded the determined value, in other words, when the component force of the pressure of the centrifugal collars 23 on the taper face 5b of the spool 5a has become larger than the urging force of the spring member 27, the moving body 22 starts to move with respect to the spool shaft 5 by an engaging and guiding action between the centrifugal collars 23 and the taper face 5b, resisting the urging force of the spring member 27. Then, along with this movement, the electrically conductive body 30 intrudes into the annular space (the magnetic field) which is formed between the inner magnet 41 and the outer magnet 42, and receives a force corresponding to an amount of intrusion (an amount of movement) and the rotation speed, from the magnetic field. Consequently, a braking force generated by this force is exerted on the spool 5a which is rotated integrally with the electrically conductive body 30. In short, the magnetic braking force according to the rotation speed of the spool 5a is exerted on the spool 5a so as to be increased and decreased, and as the results, excessive rotation of the spool 5a is prevented, and a backlash phenomenon is restrained.

In the terminal period of casting, when the rotation speed of the spool 5a is decreased and the centrifugal force exerted on the centrifugal collars 23 has become weak, in other words, when the component force of the pressure of the centrifugal collars 23 on the taper face 5b of the spool 5a has become smaller than the urging force of the spring member 27, the moving body 22 starts to be returned to the initial position by the urging force of the spring member 27. Consequently, the electrically conductive body 30 is gradually withdrawn from the annular space (the magnetic field) which is formed between the inner magnet 41 and the outer magnet 42, and the force received from the magnetic field is gradually decreased. As the results, an appropriate braking force is applied to the spool without reducing the casting distance unnecessarily in the terminal period of casting, whereby backlash can be effectively prevented.

Moreover, in the magnetic braking device 20 having the above described structure, because the initial set positions of the inner magnet 41 and the outer magnet 42 can be changed, it is possible to set the braking performance at the optimum condition.

For example, in case where a distal end area of the electrically conductive body 30 is set to be in a state entered into the annular space (the magnetic field) which is formed between the inner magnet 41 and the outer magnet 42, by rotating the first knob 60, in the initial position as shown in FIG. 3, it is possible to increase the braking force to be exerted on the spool 5a in the initial period or in the terminal period of casting, as compared with the initial set position as shown in FIG. 2. Moreover, it is possible to vary and set the braking performance from the initial period to a middle period of the rotation of the spool 5a, and from the middle period to the terminal period, and therefore, it becomes possible to extensively cope with the short casting and the long casting according to various changes of conditions of the fishing place.

Further, in this embodiment, by rotating the second knob 75, the outer magnet 42 is rotated, and consequently, the polarity relation (N-N, N-S) between the inner magnet 41 and the outer magnet 42 which are opposed to each other can be varied. Accordingly, it is possible to adjust magnitude of the magnetic field which is formed between the inner magnet 41 and the outer magnet 42, and therefore, in addition to adjustment of the movement of the magnet 40 in the axial direction as described above, more extensive change and setting of the braking performance can be obtained.

Then, another embodiment of the invention will be described.

Figure 6:
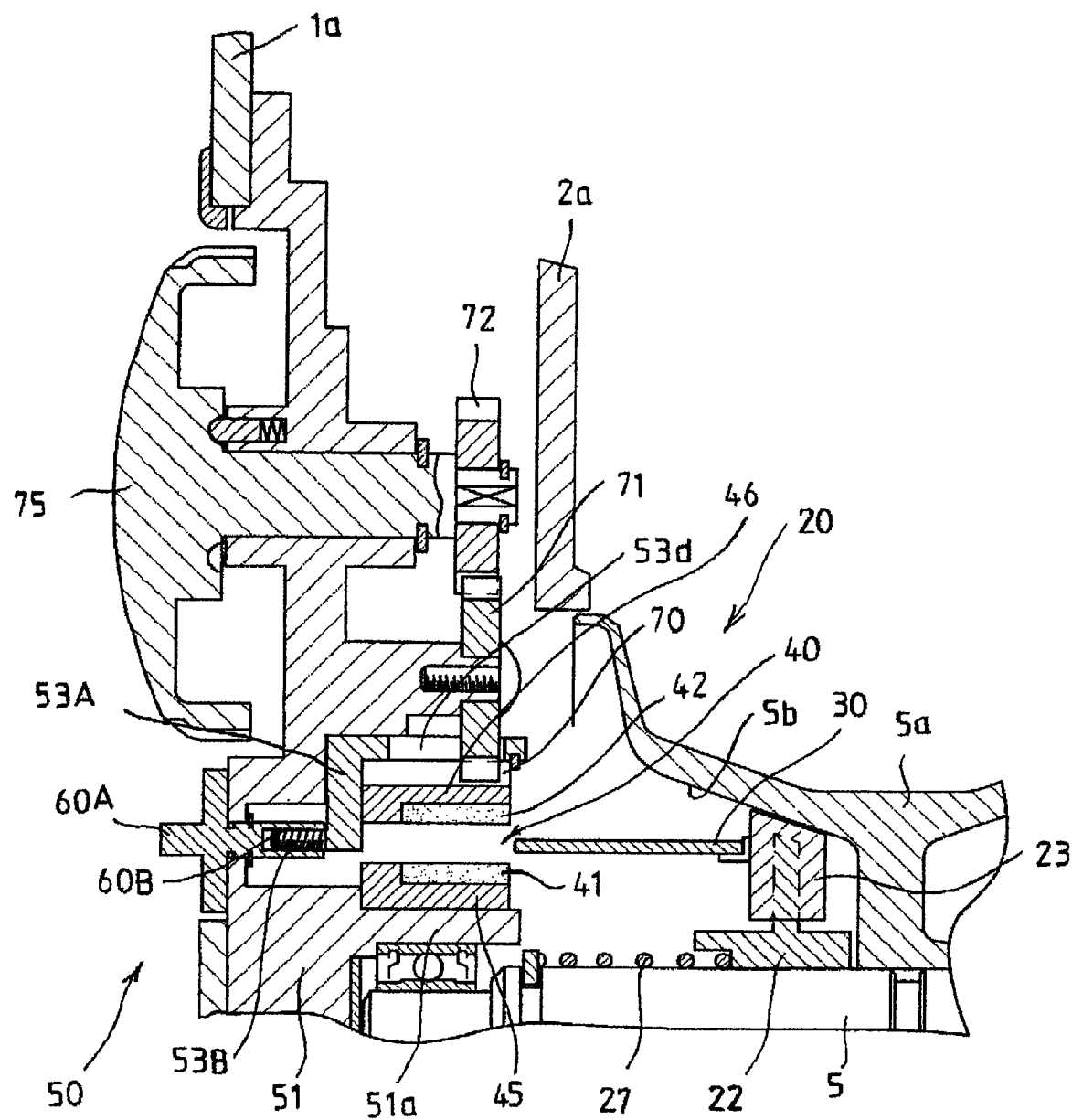
FIG. 6 is an enlarged view showing a structure of a part including a magnetic braking device in a second embodiment according to the invention.

FIG. 6 is a view showing a second embodiment of the invention. A magnet holding body 53A in this embodiment holds the outer magnet 42, and the inner magnet 41 is fixed to the outer periphery of the support part 51a of the support plate 51. The magnet holding body 53A is movable in the axial direction with respect to the support plate 51 and engaged so as not to rotate.

The aforesaid magnet holding body 53A has a projecting portion which is integrally formed therewith inside in the radial direction so as to project away from the spool, and a male screw part 53B is formed on this projecting portion. On the other hand, a first knob 60A is mounted on the support plate 51 so as to rotate and so as not to be withdrawn. This first knob 60A has an inward projecting portion provided with a female screw part 60B which is spirally engaged with the aforesaid male screw part 53B.

Figure 7:
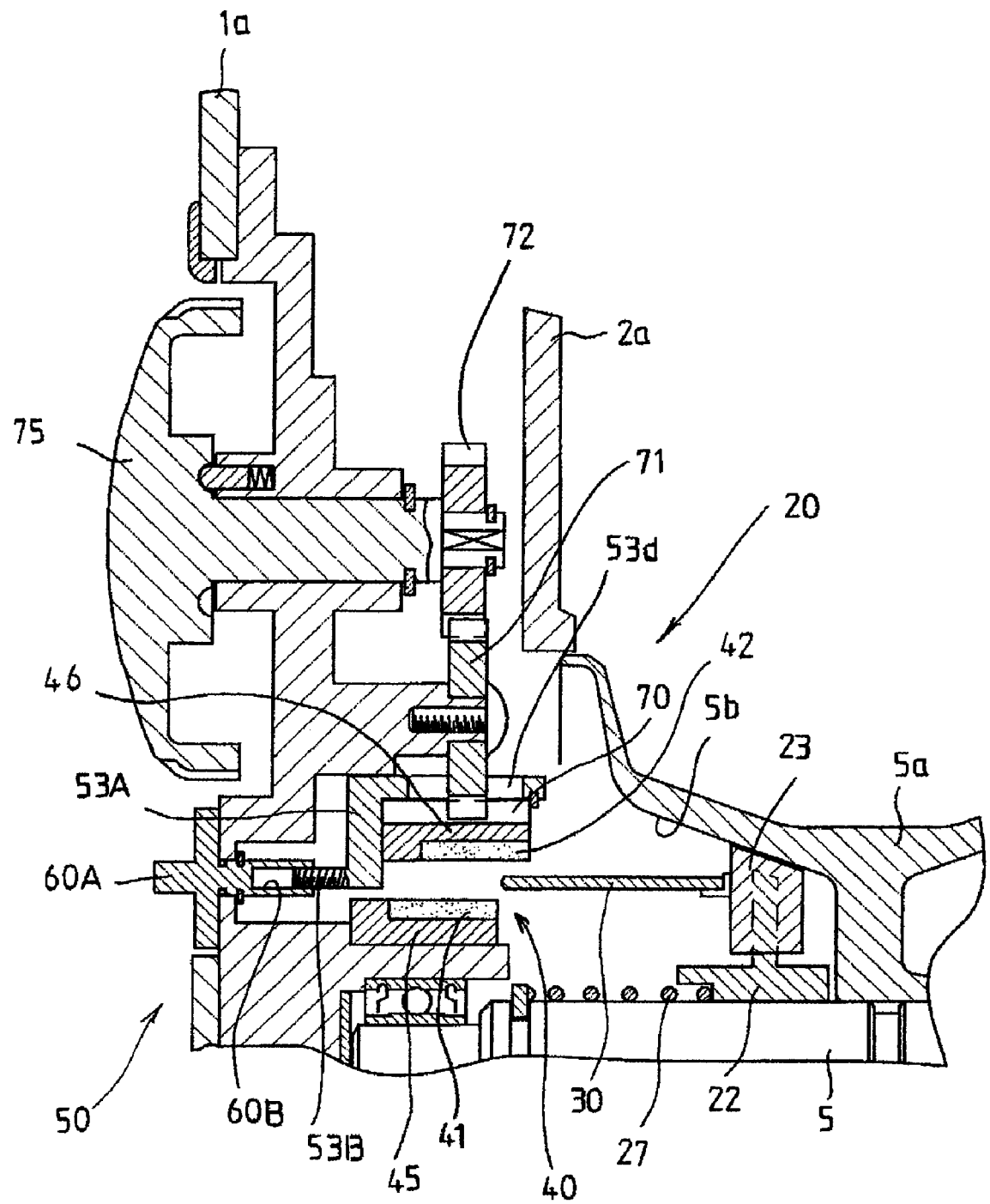
FIG. 7 is an enlarged view showing a state where the magnet has been moved from the state as shown in FIG. 6.

According to the above described structure, by rotating the first knob 60A, the magnet holding body 53A moves back and forth in the axial direction, through the spiral engagement between the male screw part 53B and the female screw part 60B. Specifically, by rotating the first knob 60A, it is possible to move the magnet holding body 53A toward the spool, as shown in FIG. 7, for example, whereby only the outer magnet 42 can be moved in the axial direction.

In this manner, in the structure where the inner magnet 41 and the outer magnet 42 are arranged at a determined interval with respect to the electrically conductive body 30, it is also possible to allow either one of the magnets to move in the axial direction, which enables the braking force to be adjusted according to the required braking performance and performance of the magnets. Of course, it is also possible to construct this embodiment so that only the inner magnet 41 can move in the axial direction, while the outer magnet 42 is fixed.

Although the embodiments of the invention have been heretofore described, the invention is not limited to the above described embodiments, but various modifications can be made. For example, the axial movement holding mechanism which holds the magnets so as to move in the axial direction may be so constructed that the inner magnet 41 and the outer magnet 42 may move in the axial direction independently from each other. Because the inner magnet 41 and the outer magnet 42 can move in the axial direction independently from each other in this manner, it becomes possible to set more extensive braking performance.

Moreover, although in the above described embodiments, the outer magnet 42 is arranged so as to move in the axial direction and so as to rotate, it is possible to allow either one of the magnets to rotate independently. Further, although in the above described embodiments, the annular magnets are arranged so as to be opposed to each other inside and outside the electrically conductive body 30, it is also possible to arrange a magnet which moves in the axial direction on either side, while a magnetic body is arranged at the other side so as to be opposed to the magnet. Still further, although the above described embodiments are so constructed that the movement in the axial direction and the rotation of the magnets can be regulated steplessly, it is also possible to regulate them stepwise.

What is claimed is:

1. A fishing reel comprising:
a reel body;
a spool shaft rotatably supported by the reel body;
a spool for winding a fishing line thereon, fixed to the spool shaft;
an electrically conductive body that is arranged at one side of the spool and is axially movably supported by the spool shaft;
a magnet provided on the reel body and arranged so as to be radially opposed to the electrically conductive body;
a radially moving member which axially moves in response to rotation of the spool, and allows the electrically conductive body to enter into and retreat from a magnetic field of the magnet by an engaging action with the spool so as to increase and decrease a magnetic braking force to be exerted on the spool; and
an axial movement holding mechanism that holds the magnet and allows the magnet to axially move relative to the reel body.

2. The fishing reel according to claim 1, wherein the magnet is arranged at least one of a radial inner side of the electrically conductive body and a radial outer side of the electrically conductive body.

3. The fishing reel according to claim 1, wherein two magnets are arranged at the inner side and the outer side of the electrically conductive body and at least one of the two magnets is rotatable.

* * * * *